(No Model.)

2 Sheets—Sheet 1.

J. J. JOHNSTON.
FLOWER VASE FOR WINDOW GARDENING.

No. 253,716.

Patented Feb. 14, 1882.

WITNESSES

INVENTOR (No Model.)

2 Sheets—Sheet 2.

J. J. JOHNSTON.
FLOWER VASE FOR WINDOW GARDENING.

No. 253,716.

Patented Feb. 14, 1882.

WITNESSES

INVENTOR
James J. Johnston

UNITED STATES PATENT OFFICE.

JAMES J. JOHNSTON, OF COLUMBIANA, OHIO.

FLOWER-VASE FOR WINDOW-GARDENING.

SPECIFICATION forming part of Letters Patent No. 253,716, dated February 14, 1882.

Application filed January 12, 1882. (No model.)

*To all whom it may concern:*

Be it known that I, JAMES J. JOHNSTON, of Columbiana, in the county of Columbiana and State of Ohio, have invented a certain new and useful Improvement in Flower-Vases for Window-Gardening; and I do hereby declare that the following is a full, clear, and exact description thereof, reference being had to the accompanying drawings, and to the letters of reference marked thereon.

My invention relates to an improvement in flower-vases for window-gardening; and it consists in constructing said vase with a series of earth-chambers arranged above each other and susceptible of detachment one from the other, and each chamber adapted to the same pedestal, which pedestal is supported in a reservoir furnished with a vertical tube, from which lead flexible siphons for supplying each of said earth-chambers with the necessary amount of water for imparting the desired humidity to the earth and the flowers in said chambers, as will hereinafter more fully and at large appear.

To enable others skilled in the art with which my invention is most nearly connected to make and use it, I will proceed to describe its construction and operation.

Figure 1:
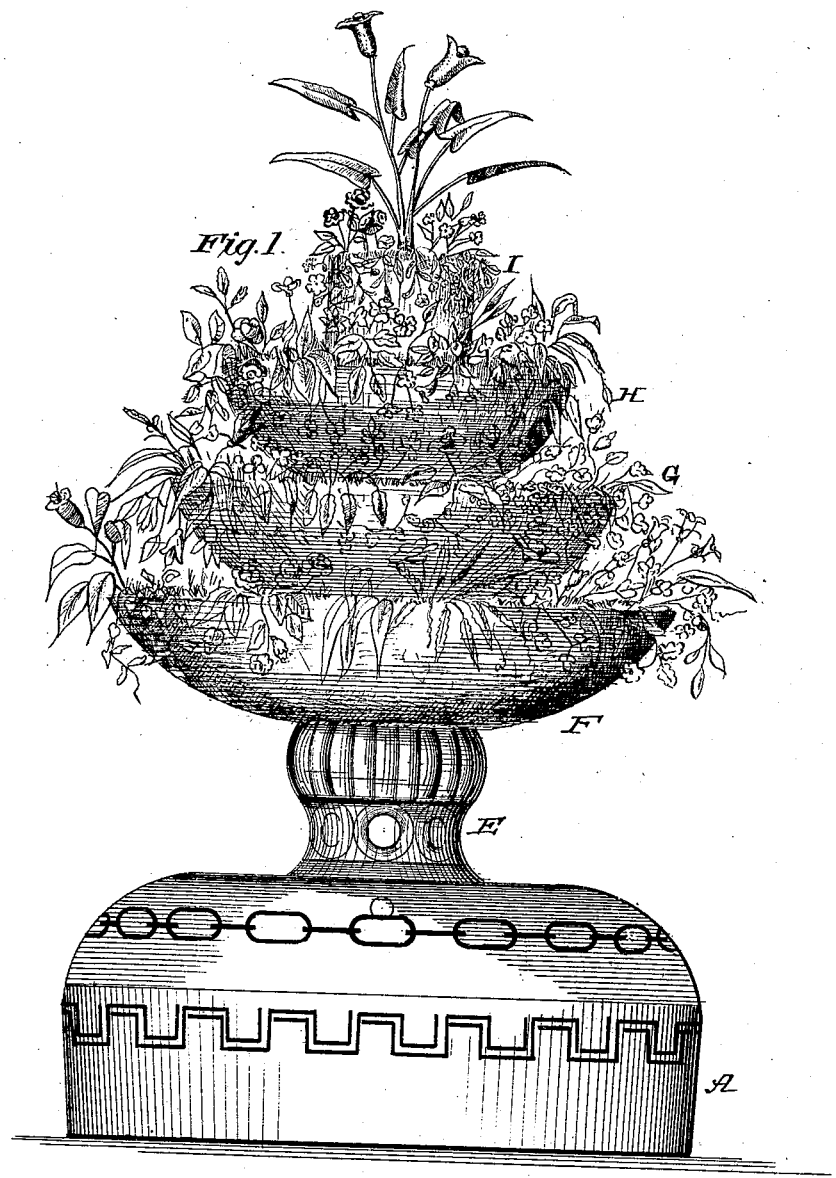
Figure 2:
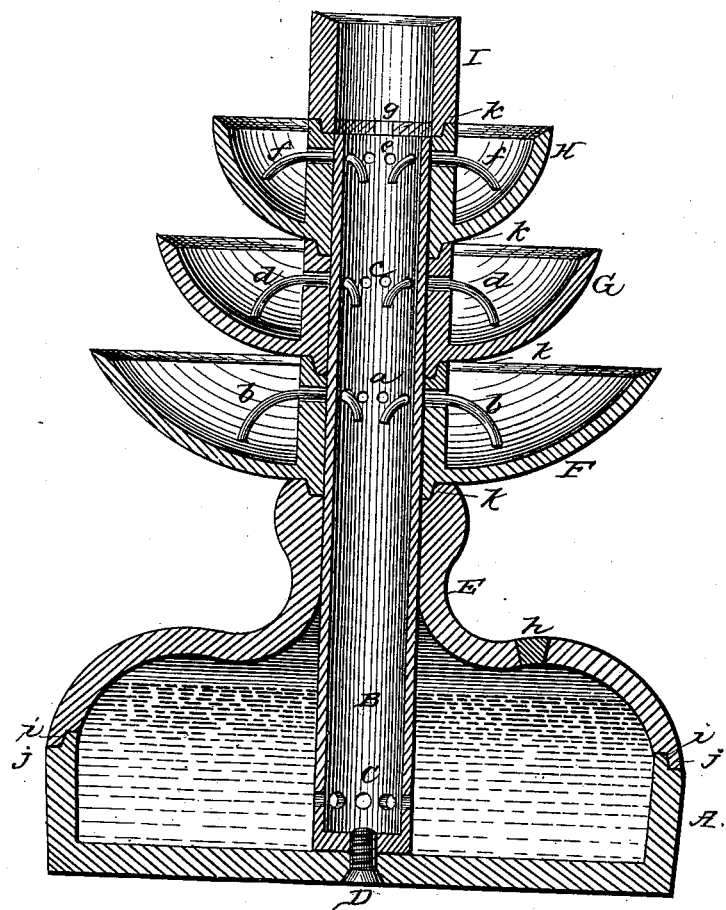

In the accompanying drawings, which form part of my specification, Figure 1 is a front elevation of my improvement in vases for window-gardening, representing said vase with flowers planted therein forming a pyramid of flowers. Fig. 2 is a vertical section of the vase and its water-reservoir.

Reference being had to the accompanying drawings, A represents the water-reservoir, from the bottom of which projects a vertical tube, B, having near its lower end openings C, which tube is held in a vertical position through the medium of a screw, D. The upper edge of the water-reservoir A is a ledge, *j*, which is fitted to a recess, *i*, in the pedestal E, which is furnished with an opening and stopper, *h*, for furnishing the reservoir A with water. The vertical stem *l* of the pedestal E is furnished with an opening, through which passes the tube B, and is furnished with a recess, *k*, for the reception of the flange *m* of the earth-chambers F, G, H, and I, all of which flanges are adapted to the recess *k* in the stem *l* of the pedestal E, and to the recess *k* in each of said earth-chambers.

The chamber I is furnished with an opening, *g*, in its bottom, and the chambers H, G, and F are furnished with openings *o* in their tubular center *n* for the insertion of elastic siphons or wicks *b d f*, which siphons should be made of some elastic material—such as india-rubber—so as to be readily withdrawn from the openings in the vertical tube B, which tube will support the several chambers in a fixed position with relation to each other.

The tube B should be packed with small pieces of sponge for taking up the water from the reservoir A, which water by capillary attraction is carried through the siphons or wicks into the earth-chambers F, G, and H, the earth-chamber I taking up the necessary amount of water from the sponge in the tube B through the opening *g*.

By constructing a vase with a series of independent earth-chambers of different diameters, as shown in Figs. 1 and 2, when two or more vases are used a variety of different combinations of flowers may be made, forming beautiful pyramids of flowers of different combinations, and the several earth-chambers may be supported each upon the same pedestal, or a series of said pedestals of the same construction, thereby converting a single vase into a number of vases by simply having a number of the pedestals E.

Having thus described my improvement, what I claim as of my invention is—

1. A flower-vase consisting of detachable earth-chambers of different diameters and having hollow centers with a recess at the upper end and a ledge at the lower end, said centers adapted to fit and rest on each other and upon the same pedestal, substantially as herein described, and for the purpose set forth.

2. The combination of the reservoir A, having tube B, pedestal E, and earth-chambers F, G, H, and I, the chambers H G F communicating with the tube B through the medium of siphons or wicks, substantially as herein described, and for the purpose set forth.

JAMES J. JOHNSTON.

Witnesses:
A. C. JOHNSTON,
JNO. W. STOCKETT.